United States Patent
Ito et al.

(10) Patent No.: US 12,186,901 B2
(45) Date of Patent: Jan. 7, 2025

(54) ROBOT SYSTEM

(71) Applicant: KABUSHIKI KAISHA YASKAWA DENKI, Kitakyushu (JP)

(72) Inventors: Tsuyoshi Ito, Kitakyushu (JP); Kiminori Nishimura, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 297 days.

(21) Appl. No.: 17/228,713

(22) Filed: Apr. 13, 2021

(65) Prior Publication Data

US 2021/0229267 A1 Jul. 29, 2021

Related U.S. Application Data

(63) Continuation of application No. PCT/JP2018/038412, filed on Oct. 16, 2018.

(51) Int. Cl.
*B25J 9/06* (2006.01)
*B25J 9/00* (2006.01)
(Continued)

(52) U.S. Cl.
CPC ............... *B25J 9/06* (2013.01); *B25J 9/0093* (2013.01); *B25J 11/005* (2013.01); *B25J 15/0019* (2013.01); *B62D 65/00* (2013.01)

(58) Field of Classification Search
CPC . B25J 9/06; B25J 9/0093; B25J 11/005; B25J 15/0019; B25J 5/02; B25J 9/0084; B62D 65/00; B23P 21/004; B23P 2700/50
See application file for complete search history.

(56) References Cited

U.S. PATENT DOCUMENTS 7,039,500 B2 * 5/2006 Milojevic .............. B25J 9/0084
700/250
9,592,611 B2 * 3/2017 Asamizu .............. B25J 15/0061
(Continued)

FOREIGN PATENT DOCUMENTS

JP 63-80081 U 5/1988
JP 06-110545 4/1994
(Continued)

OTHER PUBLICATIONS

Aburaia et al., "New Concept for Design and Control of 4 Axis Robot Using the Additive Manufacturing Technology", ScienceDirect, Pub. 2014 (Year: 2014).*
(Continued)

*Primary Examiner* — Helena Kosanovic
*Assistant Examiner* — Thao Uyen Tran-Le
(74) *Attorney, Agent, or Firm* — MORI & WARD, LLP

(57) ABSTRACT

A robot system includes first and third robots arranged along a transport direction in which a workpiece is conveyed, and a second robot arranged between the first and third robots along the transport direction. Each of the first and third robots has a first distal end at which a first end effector is configured to be provided to work on the workpiece and has a plurality of axes arranged in a first axis configuration in which a rotation axis, a pivot axis, a pivot axis, and a rotation axis are arranged in this order from the first distal end. The second robot has a second distal end at which a second end effector is configured to be provided to work on the workpiece. The second robot has a second axis configuration different from the first axis configuration.

20 Claims, 7 Drawing Sheets

(51) Int. Cl.
B25J 11/00 (2006.01)
B25J 15/00 (2006.01)
B62D 65/00 (2006.01)

(56) References Cited

U.S. PATENT DOCUMENTS

| | | | |
|---|---|---|---|
| 9,919,330 B2 * | 3/2018 | Letard | B25J 5/02 |
| 11,529,644 B2 * | 12/2022 | Bania | B05B 13/0452 |
| 2008/0060575 A1 | 3/2008 | Meissner | |
| 2009/0304940 A1 * | 12/2009 | Heldt | B25J 9/0084 |
| | | | 427/427.2 |
| 2009/0320753 A1 * | 12/2009 | Yoshino | B05B 13/0431 |
| | | | 118/315 |
| 2010/0229671 A1 * | 9/2010 | Haniya | B25J 17/0283 |
| | | | 901/29 |
| 2012/0143353 A1 | 6/2012 | Kishi | |
| 2012/0185089 A1 * | 7/2012 | Schreiber | B25J 9/1656 |
| | | | 700/250 |
| 2012/0260854 A1 * | 10/2012 | Takebe | B25J 9/0084 |
| | | | 118/500 |
| 2012/0325142 A1 * | 12/2012 | Takahashi | B05B 13/0452 |
| | | | 901/29 |
| 2013/0310973 A1 * | 11/2013 | Tanaka | B25J 9/046 |
| | | | 700/245 |
| 2014/0178156 A1 * | 6/2014 | Yoshida | B25J 21/00 |
| | | | 414/217 |
| 2015/0225180 A1 * | 8/2015 | Kurahashi | B23Q 7/04 |
| | | | 198/341.01 |
| 2016/0059413 A1 * | 3/2016 | Ogata | B25J 9/1676 |
| | | | 901/41 |

FOREIGN PATENT DOCUMENTS

| | | | | |
|---|---|---|---|---|
| JP | 2000-167451 | 6/2000 | | |
| JP | 2010-47181 | 3/2010 | | |
| JP | 2012-61553 | 3/2012 | | |
| JP | 2012-131014 | 7/2012 | | |
| JP | 2014180731 A | * | 9/2014 | B25J 18/00 |
| JP | 2015-160292 | 9/2015 | | |
| JP | 2018-43315 | 3/2018 | | |
| WO | WO 2008/108401 | 9/2008 | | |
| WO | WO 2011/055766 | 5/2011 | | |

OTHER PUBLICATIONS

Extended European Search Report for corresponding EP Application No. 18937208.9-1002, May 24, 2022.
International Search Report for corresponding International Application No. PCT/JP2018/038412, Dec. 18, 2018.
Japanese Office Action for corresponding JP Application No. 2020-551623, Mar. 1, 2022 (w/ English machine translation).
Chinese Office Action for corresponding CN Application No. 201880098699.6, Jun. 12, 2023 (w/ English machine translation).
"Principles of Robotic Arms", Employment Training and Technical Guidance Center of the Ministry of Labor and Social Security, Mechanical and Electrical Professional Committee of the National Vocational Training and Teaching Work Guidance Committee, Nov. 30, 2004, pp. 9-11, China Central Radio and TV University Press, Beijing.
Longjiang Liu, "Mechatronics Technology", 2nd Edition, Jul. 31, 2012, pp. 18-20, China Central Radio and TV University Press, Beijing.
Chinese Office Action for corresponding CN Application No. 201880098699.6, Mar. 12, 2024 (w/ English machine translation).
Chinese Office Action for corresponding CN Application No. 201880098699.6, Nov. 9, 2023 (w/ English machine translation).

* cited by examiner

ROBOT SYSTEM

CROSS-REFERENCE TO RELATED APPLICATIONS

The present application is a continuation application of International Application No. PCT/JP2018/038412, filed Oct. 16, 2018. The contents of the application are incorporated herein by reference in their entirety.

BACKGROUND

Technical Field

The present embodiment relates to a robot system.

Discussion of the Background

Conventionally, a robot system is known in which a workpiece such as a vehicle is conveyed by a conveyor into a booth having a space isolated from the outside, and a plurality of robots perform a coating operation, a sealing operation, and a welding operation on the workpiece being conveyed.

For example, WO Publication No. 2008/108401 describes a robot system in which a vehicle is conveyed by a conveyor into a coating booth and a coating operation is performed on the vehicle being conveyed.

SUMMARY

According to one aspect of the present invention, a robot system includes first and third robots arranged along a transport direction in which a workpiece is conveyed, and a second robot arranged between the first and third robots along the transport direction. Each of the first and third robots has a first distal end at which a first end effector is configured to be provided to work on the workpiece and has a plurality of axes arranged in a first axis configuration in which a rotation axis, a pivot axis, a pivot axis, and a rotation axis are arranged in this order from the first distal end. The second robot has a second distal end at which a second end effector is configured to be provided to work on the workpiece. The second robot has a second axis configuration different from the first axis configuration.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings.

DESCRIPTION OF EMBODIMENTS

Hereinafter, embodiments of a robot system disclosed in the present application will be described in detail with reference to the accompanying drawings. Note that the present invention is not limited to the embodiments described below. In addition, hereinafter, a case where the robot performs a so-called welding operation will be mainly described, but the operation content is not limited to welding, and may be picking of the workpiece, coating, application of a sealing agent, or the like.

In addition, in the embodiments described below, expressions such as "orthogonal", "vertical", "parallel", "coincident", "overlapping", and "symmetrical" are used, but it is not necessary to strictly satisfy these states. In other words, the expressions described above allow deviations in manufacturing accuracy, installation accuracy, and the like.

Figure 1:
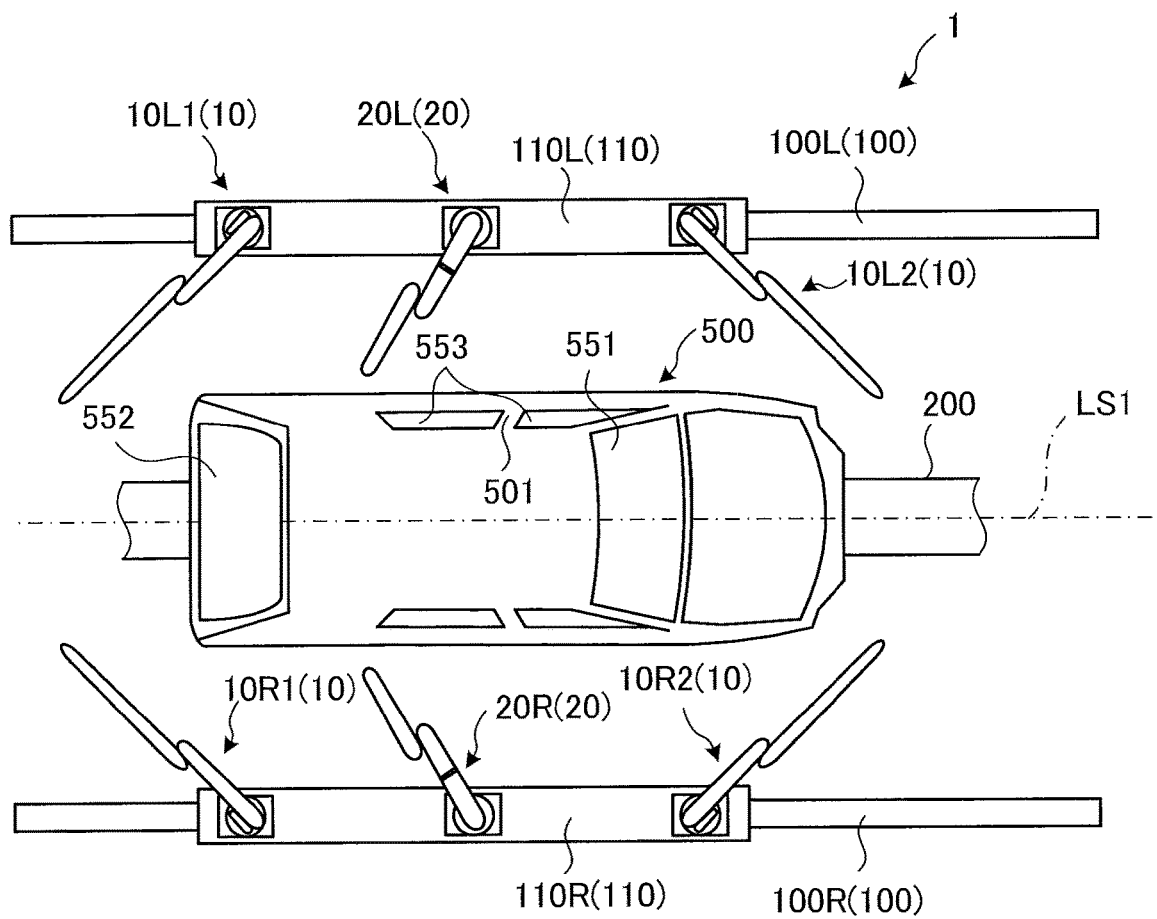
FIG. 1 is a schematic diagram of a robot system according to an embodiment.

First, a robot system 1 according to an embodiment will be described with reference to FIG. 1. FIG. 1 is a schematic diagram of a robot system 1 according to the embodiment. FIG. 1 corresponds to a schematic view of the robot system 1 that performs work on the conveyed workpiece 500 as viewed from above.

FIG. 1 illustrates a three-dimensional orthogonal coordinate system including a Z axis in which a vertically upward direction is a positive direction and an X axis in which a conveyance direction (traveling direction) of the conveyed workpiece 500 is a positive direction. Such an orthogonal coordinate system may be shown in other drawings used in the following description.

As shown in FIG. 1, the robot system 1 includes first and third robots 10 and a second robot 20 having an axis configuration different from the axis configuration of the first and third robots 10. The first robot is indicated as, for example, 10R2. The third robot is indicated as, for example, 10R1. The second robot is indicated as, for example, 20R. The first and third robots may have the same structure, or may have different structures. In the present embodiment, the first and third robots has the same structure. Accordingly, in the present embodiment, the first robot is described. The first robot 10 is an articulated robot that is arranged along the transport direction (direction parallel to the X axis) of the workpiece 500 to work the workpiece 500. The second robot 20 is an articulated robot that is provided between the two first robots 10 along the transport direction of the workpiece 500 to work the workpiece 500.

The first robot 10 and the second robot 20 work the workpiece 500 being transferred by the transport device 200. That is, the work can be performed without stopping the conveyance of the workpiece 500.

Here, in FIG. 1, a vehicle being manufactured is exemplified as the workpiece 500, but the type thereof is not limited as long as the work object has a gap therein and has the opening 551 on the front surface, the opening 552 on the back surface, and the opening 553 on the side surface of the workpiece 500 in the transport direction. That is, it is sufficient that the workpiece 500 has the opening 551 on the front surface, the opening 552 on the back surface, and the opening 553 on the side surface which communicate with the internal space. For example, a belt conveyor can be used as a transport device 200.

Further, FIG. 1 shows a case where two first robots (a first robot and a third robot) 10 and one second robot 20 are arranged on the right side of the direction in which the workpiece 500 are moving (X axis positive direction 112), and two first robots 10 and one second robot 20 are arranged on the left side thereof. However, the present invention is not limited thereto, and each robot may be disposed only on the right side or only on the left side. That is, the robot system 1 may include at least two first robots 10 and one second robot 20 disposed between the two first robots 10 in the transport direction.

In FIG. 1, the first robot 10 disposed on the right side of the workpiece 500 is described as a first robot 10R, and the second robot 20 is described as a second robot 20R. For the plurality of first robots 10R, serial numbers such as "1" and "2" are added to the ends of the reference numerals. For the left side of the workpiece 500, "L" is used instead of "R".

Note that the robot on the right side in the transport direction (X axis positive direction) of the workpiece 500 and the corresponding robot on the left side are disposed at positions at equal distances from the transport center line LS1 (parallel to the transport direction) of the workpiece 500. Therefore, the following description will be made mainly on the right side of the workpiece 500. The workpiece 500 has a substantially symmetrical shape with respect to the transport center line LS1. The transport center line LS1 shown in FIG. 1 corresponds to a plane parallel to the XZ plane when viewed from the X axis negative direction side.

As illustrated in FIG. 1, the robot system 1 includes a traveling table 110 that travels on a traveling shaft 100 along the transport direction of the workpiece 500. Although FIG. 1 shows a case where the first robot 10R1, the second robot 20R, and the first robot 10R2 are mounted on the same traveling table 110R that travels on the traveling shaft 100R and collectively travel on the traveling shaft 100R, it is sufficient that at least one of them travels on the traveling shaft 100R. That is, the other robots may be fixed to a floor or the like.

In this manner, by causing at least one of the robots to travel along the transport direction, it becomes easier to perform work on the workpiece 500 while avoiding interference between the workpiece 500 and the robot. The number of traveling shaft 100 and the number of traveling tables 110 are not limited to those shown in FIG. 1, but will be described later with reference to FIGS. 7A and 7B.

In addition, if the right traveling table 110R and the left traveling table 110L of the workpiece 500 are caused to travel in conjunction with each other in accordance with the transport speed of the workpiece 500, it is easy to simultaneously perform work on the workpiece 500 being conveyed from both the right and left sides. The work on the workpiece 500 may be performed at different timings on the left and right sides by shifting the traveling period between the traveling table 110R and the traveling table 110L.

The first robot 10 is an articulated robot having seven axes arranged in an axis configuration in which a rotation axis, a pivot axis, a pivot axis, and a rotation axis are arranged in an order from the distal end of the first robot. Here, the "rotation axis" is defined as an axis around which adjacent connected arms are relatively rotated without the angle between the adjacent connected arms being changed, and the "pivot axis" is defined as an axis around which adjacent connected arms are relatively rotated such that the angle between the adjacent connected arms changes. The detailed configuration of the first robot 10 will be described later with reference to FIG. 2.

One of the two first robots 10 inserts its distal end into the opening 551 on the front surface of the workpiece 500 with respect to the transport direction to work the interior of the workpiece 500, and the other performs inserts its distal end to into the opening 552 on the back surface of the workpiece 500 to work the interior of the workpiece 500.

The second robot 20 is preferably an articulated robot having seven axes arranged in an axis configuration in which a rotation axis, a pivot axis, a rotation axis, and a pivot axis are arranged in an order from the proximal end of the second robot. The detailed configuration of the second robot 20 will be described later with reference to FIG. 3. The number of axes of the second robot 20 may be less than seven or more than seven as long as the second robot 20 has an axis configuration in which a rotation axis, a pivot axis, a rotation axis, and a pivot axis are arranged in this order from the proximal end.

The second robot 20 inserts its distal end of the second robot 20 into the opening 553 on the side surface of the workpiece 500 with respect to the transport direction. Here, as described above, since the second robot 20 has the axis configuration in which a rotation axis, a pivot axis, a rotation axis, and a pivot axis are arranged in this order from the proximal end of the second robot, the second robot 20 can easily enter the workpiece 500 without interfering with the workpiece 500 by the rotation of the rotation axis sandwiched by the pivot axis, and can efficiently perform work the interior of the workpiece 500.

Note that the opening 553 in the side surface is, for example, an opening for a front door and an opening for a rear door that are separated by a pillar that is a so-called "B pillar". The second robot 20 can efficiently perform work from the interior of the workpiece 500 to the back side of the pillar 501 along the extending direction of the pillar 501.

In addition, since the first robot 10 and the second robot 20, which are the articulated robots and, perform work on the workpiece 500 being conveyed by the transport device 200, it is not necessary to stop the conveyance of the workpiece 500 during the work. Therefore, the throughput of the work on the workpiece 500 can be increased.

Each of the first robot 10 and the second robot 20 can perform an arc welding operation on the workpiece 500 by attaching an arc welding end effector for arc welding to a tip thereof. Here, since the first robot 10 and the second robot 20 can simultaneously perform the work from the front and rear direction and the work from the side with respect to the workpiece 500, the efficiency of the arc welding work by the robots can be improved.

In addition, the first robot 10 and the second robot 20 can perform a sealing operation on the workpiece 500 by attaching sealing end effectors for sealing, which apply a sealing agent, to tips thereof, respectively. Here, since the first robot 10 and the second robot 20 can simultaneously perform the work from the front and rear direction and the work from the side with respect to the workpiece 500, it is possible to improve the efficiency of the sealing work by the robots.

Figure 2:
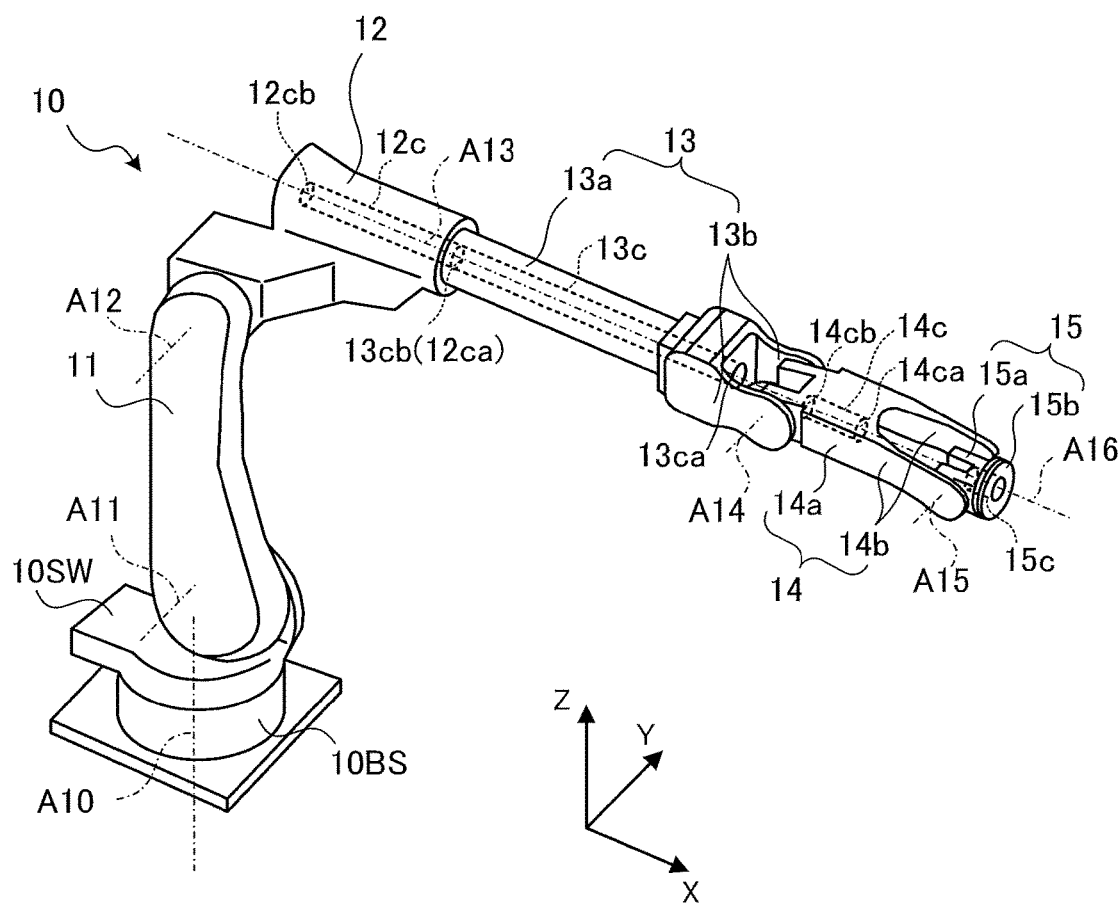
FIG. 2 is a perspective view of the first robot.

Next, the configuration of the first robot 10 will be described with reference to FIG. 2. FIG. 2 is a perspective view of the first robot 10, corresponds to a perspective view of the first robot 10 viewed obliquely from above.

As shown in FIG. 2, the first robot 10 is a so-called vertical articulated robot having seven axes of a vertical axis A10 and first to sixth axes A11 to A16. The first robot 10 includes a base portion 10BS, a swing portion 10SW, a first arm 11, a second arm 12, a third arm 13, a fourth arm 14, and a wrist portion 15 from the proximal end side to the distal end side.

Here, in a general six-axis robot (a rotation axis, a pivot axis, a pivot axis, a rotation axis, a pivot axis, and a rotation axis from the proximal end), when three axes from the proximal end side are referred to as "basic axes" and the remaining three axes are referred to as "wrist axes", the first robot 10 can be referred to as a robot having four axes by adding one axis to the "wrist axis".

That is, in the first robot 10, three axes from the proximal end side are the "basic axis" and the remaining four axes are the "wrist axis", the "basic axis" has an axis configuration in the order of the rotation axis, the pivot axis, and the pivot axis from the proximal end, and the "wrist axis" has an axis configuration in which a rotation axis, a pivot axis, a pivot axis, and a rotation axis are arranged in an order from the distal end.

The "wrist axis" has an axis configuration in which a rotation axis, a pivot axis, a pivot axis, and a rotation axis are arranged in this order when viewed from the base end side toward the distal end side. Here, regarding the axis configuration of the first robot 10, the basic axis may be referred to as three axes of "SLU" and the wrist axis may be referred to as four axes of "RBBT" in order from the base end side to the distal end side.

As shown in FIG. 2, the distal end sides of the third arm 13 and the fourth arm 14 have a so-called bifurcated shape, and in the posture shown in FIG. 2, an "open space" that is open in the vertical direction (direction along the Z axis) is secured.

The third arm 13 is provided with a through hole 13c along the third axis A13. The opening of the through hole 13c on the proximal end side (X axis negative direction side) is an opening 13cb, and the opening on the distal end side (X axis positive direction side) is an opening 13ca. Here, the central axes of the through holes 13c preferably coincide with the third axis A13.

This is because the external cable is less likely to be affected by the rotation of the third arm 13 when the external cable is inserted into the 13c of the through hole. Here, as the external cable, a cable for supplying gas, liquid, electric power, or wire, or a cable obtained by collectively covering these cables can be used.

As shown in FIG. 2, the fourth arm 14 is provided with a through hole 14c along the third axis A13 in a posture in which the third axis A13 and the sixth axis A16 overlap each other. The opening of the through hole 14c on the proximal end side (X axis negative direction side) is an opening 14cb, and the opening on the distal end side (X axis positive direction side) is an opening 14ca.

Here, the central axis of the through hole 14c preferably coincides with the third axis A13. This is because the external cable inserted into the through hole 13c can be easily inserted into the through hole 14c in the posture shown in FIG. 2.

Further, the second arm 12 is provided with a through hole 12c along the third axis A3. The opening of the through hole 12c on the proximal end side (X axis negative direction side) is an opening 12cb, and the opening on the distal end side (X axis positive direction 112 side) is an opening 12ca.

In the wrist portion 15, a through hole 15c along the third axis A13 is formed in a posture in which the third axis A13 and the sixth axis A16 overlap each other. As described above, the third arm 13 is provided with the through hole 13c and the open space, and the fourth arm 14 is provided with the through hole 14c and the open space.

That is, the through hole 12c of the second arm 12 communicates with the through hole 13c of the third arm 13, and the through hole 13c communicates with the open space of the third arm 13. The open space of the third arm 13 communicates with the through hole 14c of the fourth arm 14, and the through hole 14c communicates with the open space of the fourth arm 14. The open space of the fourth arm 14 communicates with the 15c of the through hole of the wrist portion 15.

That is, in the posture illustrated in FIG. 2, the first robot 10 is configured such that the through hole 12c of the second arm 12 and the through hole 15c of the wrist portion 15 communicate with each other in a straight line along the third axis A13. Therefore, an external cable for the end effector attached to the wrist portion 15 can be easily inserted from the second arm 12 to the wrist portion 15. It is preferable that the diameters of the through hole 12c, the through hole 13c, the through hole 14c, and the through hole 15c are substantially the same.

Further, as described above, the "open space" is secured in the third arm 13 and the fourth arm 14. Therefore, external devices such as instruments can be accommodated in the open space. Accordingly, since the external device does not protrude from the surface of the first robot 10, the movable range of the first robot 10 can be widened. In addition, it is possible to easily perform maintenance of external devices and external cables be easily performed using the open space.

As shown in FIG. 2, the distal end side of the third arm 13 and the proximal end side of the fourth arm 14 each have a so-called bifurcated shape. In this way, since the two bifurcated shapes 117 face each other, the above-described "open space" in the third arm 13 can be further widened.

The proximal end side of the wrist portion 15 also has a so-called bifurcated shape. By forming the proximal end side of the wrist portion 15 into the bifurcated shape in this manner, the two bifurcated shapes 117 face each other, and thus the above-described "open space" in the fourth arm 14 can be further widened.

When the external cable for the end effector is inserted into the first robot 10, the open space serves as an escape space for the external cable whose posture changes in accordance with a change in the posture of the first robot 10. Therefore, it is possible to avoid sudden bending of the external cable.

Here, it is preferable that a relationship of "L1>L2" is satisfied, where "L1" is a distance between the second axis A12 and the fourth axis A14 being along in the X direction, and "L2" is a distance between the fourth axis A14 and the fifth axis A15 being along in the X direction. In this way, even when the third arm 13 or the fourth arm 14 is inserted into a narrow space, it is easy to change the posture of the second arm 12.

Further, the ratio of "L1" to "L2" is preferably in the range of "2:1" to "4:1", and more preferably about "3:1". This is because if "L2" is made too short with respect to "L1", the reach of the wrist portion 15 in a narrow space is narrowed.

Hereinafter, the configuration of the first robot 10 will be described in more detail. The base portion 10BS is fixed to an installation surface such as the traveling table 110 (see FIG. 1) or a floor. The swing portion 10SW is supported by the base portion 10BS and rotates around a vertical axis A10 perpendicular to the installation surface. A proximal end side of the first arm 11 is supported by a swing portion 10SW, and the first arm 11 turns around a first axis A10 perpendicular to a vertical axis A11. The proximal end side of the second arm 12 is supported by the distal end side of the first arm 11, and the second arm 12 turns around a second axis A11 parallel to the first axis A12.

The proximal end side of the third arm 13 is supported by the distal end side of the second arm 12, and the third arm 13 rotates around a third axis A13 perpendicular to the second axis A12. The third arm 13 has a proximal end portion A13 provided with a through hole 13c along the third axis A13 and an extending portion 13b. The extending portion 13b extends toward the distal end side along the third axis A13 from a position avoiding an opening 13ca of the through hole 13c on the proximal end portion 13a.

Here, FIG. 2 shows a case where two extending portions 13b are provided so as to sandwich the opening 13ca and the fourth arm 14 is supported by the two extending portions 13b, but one of the two extending portions 13b may be omitted and one extending portion may be provided, that is, the third arm 13 may have a so-called cantilever shape.

The proximal end side of the fourth arm 14 is supported by a distal end side of the third arm 13, and the fourth arm 14 turns around a fourth axis A4 orthogonal to the third axis A3. The fourth arm 14 includes a proximal end portion 14a provided with a through hole 14c along the third axis A13 and an extending portion 14b in a posture in which the third axis A13 and the sixth axis A16 overlap each other. The extending portion 14b extends toward the distal end side along the third axis A13 from a position avoiding an opening 14c of the through hole 14c on the proximal end portion 14a.

Here, FIG. 2 shows a case where two extending portions 14b are provided so as to sandwich the opening 14ca and the wrist portion 15 is supported by the two extending portions 14b, but one of the two extending portions 14b may be omitted and one extending portion LA may be provided, that is, the fourth arm 14 may have a so-called cantilever shape.

A proximal end side of the wrist portion 15 is supported on a distal end side of the fourth arm 14, the wrist portion 15 turns around a fifth axis A14 parallel to the fourth axis A15, and the distal end side of the wrist portion 15 rotates around a sixth axis A16 orthogonal to the fifth axis A15. The proximal end side of the wrist portion 15 is a turning part 15a, and the distal end side is a rotating part 15b. The wrist portion 15 is provided with a through hole 15c along the third axis A13 in a posture in which the third axis A13 and the sixth axis A16 overlap each other.

Various end effectors are detachably fixed to the distal end side of the wrist portion 15 in accordance with the contents of work. For example, when the first robot 10 is caused to perform an arc welding operation, an end effector for arc welding is attached to the distal end side of the wrist portion 15. When the first robot 10 is caused to perform a sealing operation of applying a sealing agent, an end effector for sealing is attached to the distal end side of the wrist portion 15.

Figure 3:
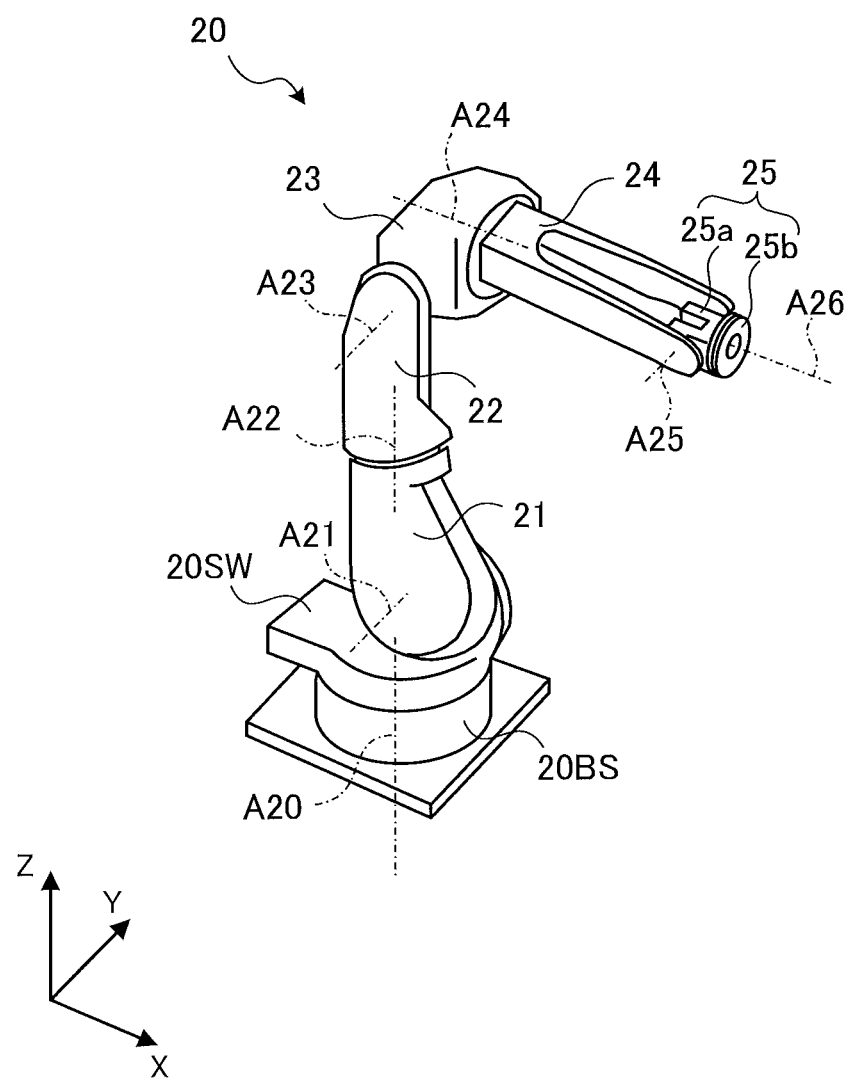
FIG. 3 is a perspective view of the second robot.

Next, the configuration of the second robot 20 will be described with reference to FIG. 3. FIG. 3 is a perspective view of the second robot 20. FIG. 3 corresponds to a perspective view of the second robot 20 viewed obliquely from above.

As shown in FIG. 3, the second robot 20 is a so-called vertical articulated robot having seven axes of a vertical axis A20 and first to sixth axes A21 to A26. The second robot 20 includes a base portion 20BS, a swing portion 20SW, a first arm 21, a second arm 22, a third arm 23, a fourth arm 24, and a wrist portion 25 from the proximal end side toward the distal end side.

Here, in a general six-axis robot (a rotation axis, a pivot axis, a pivot axis, a rotation axis, a pivot axis, and a rotation axis from the proximal end of the robot), when three axes from the proximal end side are referred to as "basic axes" and the remaining three axes are referred to as "wrist axes", the second robot 20 can be referred to as a robot having four axes by adding one axis to the "basic axis".

That is, in the second robot 20, four axes from the proximal end side are "basic axes" and the remaining three axes are the "wrist axis", the "basic axis" has an axis configuration in which a rotation axis, a pivot axis, a rotation axis, and a pivot axis are arranged in the order from the proximal end side of the second robot, and the "wrist axis" has an axis configuration in which a rotation axis, a pivot axis, and a rotation axis are arranged in the order from the proximal end side of the first robot. Here, regarding the axis configuration of the second robot 20, the basic axis may be referred to as four axes of "SLEU" and the wrist axis may be referred to as three axes of "RBT" in order from the base end side to the distal end side.

As shown in FIG. 3, the distal end side of the fourth arm 24 has a so-called bifurcated shape 117, and in the posture shown in FIG. 3, an "open space" that is open in the vertical direction (direction along the Z axis) is secured. Further, the proximal end side of the wrist portion 25 also has a so-called bifurcated shape 117, and the two bifurcated shapes 117 face each other. Therefore, the above-described "open space" in the fourth arm 24 can be further widened. The effect of providing the "open space" is similar to that of the first robot 10 illustrated in FIG. 2.

The base portion 20BS is fixed to an installation surface such as the traveling table 110 (see FIG. 1) or a floor. The swing portion 20SW is supported by the base portion 20BS and rotates around a vertical axis A20 perpendicular to the installation surface. A proximal end side of the first arm 21 is supported by a swing portion 20SW, and the first arm 21 turns around a first axis A21 perpendicular to a vertical axis A20. The proximal end side of the second arm 22 is supported by the distal end side of the first arm 21, and the second arm 22 rotates around a second axis A22 perpendicular to the first axis A21. The proximal end side of the third arm 23 is supported by the distal end side of the second arm 22, and the third arm 23 turns around a third axis A23 perpendicular to the second axis A22.

The based end side of the fourth arm 24 is supported by the distal end side of the third arm 23, and the fourth arm 24 rotates around a fourth axis A24 perpendicular to the third axis A23. The fourth arm 24 has a proximal end portion provided with a through hole along the fourth axis A24 and an extending portion. The extending portion extends from a position avoiding the opening of the through hole in the proximal end portion toward the distal end side along the fourth axis A24.

A proximal end side of the wrist portion is supported on the distal end side of the fourth arm 24, the wrist portion 25 turns around a fifth axis A25 perpendicular to the fourth axis A24, and the distal end side of the wrist portion 25 rotates around a sixth axis A26 orthogonal to the fifth axis A25. The proximal end side of the wrist portion 25 is the turning part 25a, and the distal end side is the rotating part 25b. The wrist portion 25 is provided with a through hole extending along the fourth axis A24 in a posture in which the fourth axis A24 and the sixth axis A26 overlap each other.

Various end effectors are detachably fixed to the distal end side of the wrist portion 25 in accordance with the contents of work. For example, when the second robot 20 is caused to perform an arc welding operation, an end effector for arc welding is attached to the distal end side of the wrist portion 25. When the second robot 20 is caused to perform a sealing operation of applying a sealing agent, an end effector for sealing is attached to the distal end side of the wrist portion 25.

Next, the robot system 1 viewed from the back side of the workpiece 500 will be described with reference to FIG. 4.

Figure 4:
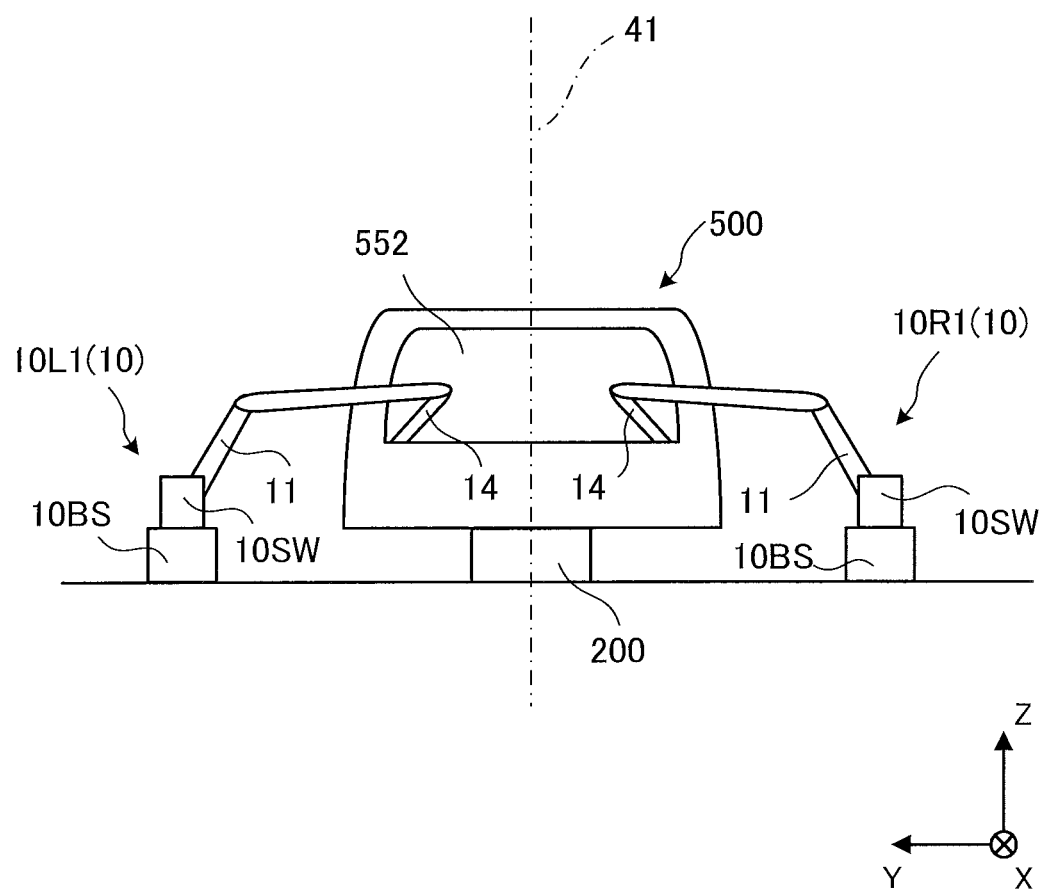
FIG. 4 is a schematic diagram of the robot system viewed from the back side of the workpiece.

FIG. 4 is a schematic diagram of the robot system 1 viewed from the back side of the workpiece 500. FIG. 4 corresponds to a view of the robot system 1 shown in FIG. 1 as viewed from the upstream side in the transport direction (X axis negative direction side). In FIG. 4, descriptions of the second robot 20, the traveling shaft 100, and the traveling table 110 illustrated in FIG. 1 are omitted and not illustrated.

As illustrated in FIG. 4, the first robot 10 inserts at least the distal end side of the fourth arm 14 into the opening 552 on the back surface of the workpiece 500 to work the interior (for example, the bottom surface, the side surface, or the top surface) of the workpiece 500. The work may be performed by inserting the third arm 13 (see FIG. 2) into the workpiece 500.

Here, the base portion 10BS of the first robot 10L1 and the base portion 10BS of the first robot 10R1 are arranged at substantially equal distances with respect to a plane 41 which passes through the transport center line CL and is parallel to the XZ plane shown in FIG. 1.

Further, as shown in FIG. 4, each of the first robots 10 can perform an operation in a state where the fourth arm 14 is folded toward the base portion BS side of the first robot 10. Therefore, the first robot 10R1 can take charge of an area on a near side (the Y axis negative direction side) of the surface 41 in the workpiece 500, and the first robot 10L1 can take charge of an area on a near side (Y axis positive direction side) of the surface 41 in the workpiece 500.

That is, the first robot 10R1 can simultaneously work in an area on the right side (Y axis negative direction side) of the surface 41, and the first robot 10L1 can simultaneously work in an area on the left side (Y axis positive direction side) of the surface 41. This is because the fourth arm 14 is less likely to interfere with an arm of another robot than when the fourth arm 14 is not folded. Therefore, by adjusting the distances between the first robot 10R1 and the first robot 10L1 along the Y axis, it is possible to avoid interference between both robots, and thus it is not necessary to perform complicated operation control such as exclusive operation between the plurality of first robots 10.

Note that the first robot 10R2 (see FIG. 1) and the first robot 10L2 (see FIG. 1) can simultaneously work on the opening 551 (see FIG. 1) on the front surface of the workpiece 500. Thus, the work related to the opening 551 on the front surface and the work related to the opening 552 on the rear surface can be simultaneously performed. Therefore, the efficiency of the work of the interior of the workpiece 500 can be improved.

Figure 5:
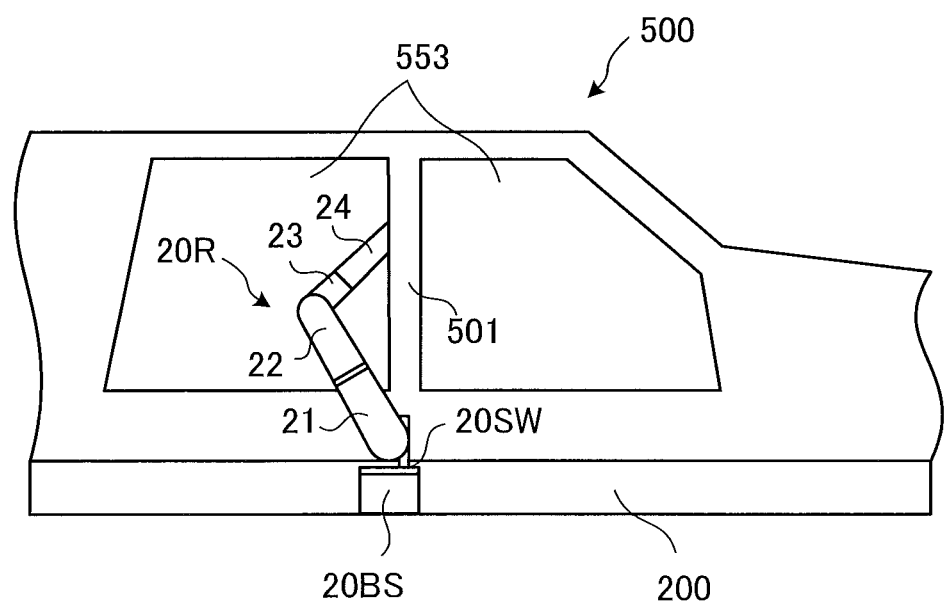
FIG. 5 is a schematic diagram of the robot system viewed from the side of the workpiece.

Next, the robot system 1 viewed from the side surface side of the workpiece 500 will be described with reference to FIG. 5. FIG. 5 is a schematic diagram of the robot system 1 viewed from a side surface side of the workpiece 500. FIG. 5 corresponds to a view of the robot system 1 shown in FIG. 1 viewed from the right side (Y axis negative direction side) of the workpiece 500. FIG. 5, the first robot 10, the traveling shaft 100, and the traveling table 110 illustrated in FIG. 1 are not illustrated.

Further, in FIG. 5, the description of the second robot 20L shown in FIG. 1 is also omitted, but the second robot 20L and the second robot 20R can simultaneously perform at the same time as in the case shown in FIG. 4.

That is, the second robot 20L (see FIG. 1) can take charge of an area on the left side (Y axis positive direction side) of the surface 41 shown in FIG. 4, and the second robot 20R can take charge of an area on the right side (Y axis negative direction side) of the surface 41 shown in FIG. 4.

FIG. 5 shows a case where the second robot 20R works on the back side of the pillar 501 close to the robot. For example, the second robot 20R can perform work along the extending direction of the pillar 501 (parallel to the Z axis direction in the figure).

To be more specific, as shown in FIG. 5, the second robot 20R makes at least the fourth arm 24 enter from the opening 553 on the side surface of the workpiece 500 to perform work on the back side of the pillar 501. The second arm 22 and the third arm 23 may be inserted into the workpiece 500 to perform the work.

FIG. 5 shows the case where the robot 20R enters from the opening 553 on the side surface on the X axis negative direction side of the pillar 501, but the robot 20R may enter from the opening 553 on the side surface on the X axis positive direction side.

Further, the work by the second robot 20 related to the opening 553 on the side surface shown in FIG. 5 can be performed simultaneously with the work by the first robot 10 related to the opening 552 on the back surface shown in FIG. 4. Therefore, the efficiency of the work of the interior of the workpiece 500 can be improved. That is, since the work from the front and rear direction and the work from the side can be simultaneously performed on the workpiece 500, the work of the interior of the workpiece 500 can be performed in a short time.

Figure 6:
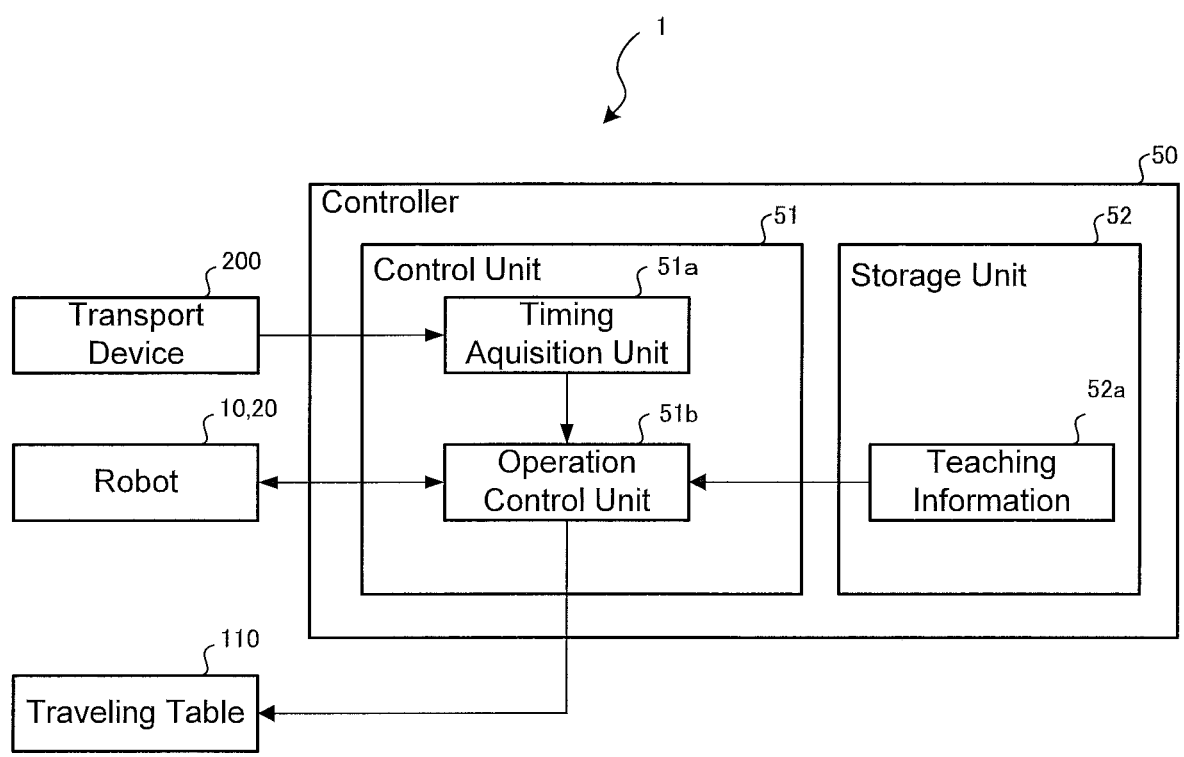
FIG. 6 is a block diagram showing the configuration of the robot system.

Next, a configuration of the robot system 1 according to the embodiment will be described with reference to FIG. 6. FIG. 6 is a block diagram illustrating a configuration of the robot system 1. As illustrated in FIG. 6, the robot system 1 includes a transport device 200, robots (a first robot 10 and a second robot 20), a traveling table 110, and a controller 50. The transport device 200, the first robot 10, the second robot 20, and the traveling table 110 are connected to the controller 50. The robot system 1 may not include the transport device 200, and the robot system 1 may acquire the transport state from the transport device 200 and operate using the acquired transport state.

The controller 50 includes a control unit 51 and a storage unit 52. The control unit 51 includes a timing acquisition unit 51a and an operation control unit 51b. The storage unit 52 stores teaching information 52a. Although one controller 50 is shown in FIG. 6 in order to simplify the description, a plurality of controllers 50 may be used. In this case, a higher-level controller that bundles the controllers may be provided.

Here, the controller 50 includes, for example, a computer having a central processing unit (CPU), a read only memory (ROM), a random access memory (RAM), a hard disk drive (HDD), an input/output port, and the like, and various circuits. The CPU of the computer functions as a timing acquisition unit 51a and an operation control unit 51b of the control unit 51 by reading and executing a program stored in the ROM, for example.

At least one or all of the timing acquisition unit 51a and the operation control unit 51b may be configured by hardware such as an application specific integrated circuit (ASIC) or a field programmable gate array (FPGA).

The storage unit 52 corresponds to, for example, a RAM or an HDD. The RAM or the HDD can store the teaching information 52a. The controller 50 may acquire the above-described program and various kinds of information via another computer or a portable recording medium connected via a wired or wireless network. Further, as described above, the controller 50 may be configured as a plurality of devices capable of communicating with each other, or may be configured as a hierarchical device capable of communicating with an upper or lower device.

The control unit 51 acquires information such as the transport speed and the position of the workpiece 500 (see FIG. 1) from the transport device 200, and performs operation control of the first robot 10, the second robot 20, and the traveling table 110. When a plurality of controllers 50 are provided, the control unit 51 may also perform a process of synchronizing the plurality of controllers 50.

The timing acquisition unit 51*a* acquires information such as the transport speed and the position of the workpiece 500 from the transport device 200. Then, the timing acquisition unit 51*a* determines operation timings and operation contents of the first robot 10, the second robot 20, and the traveling table 110 based on the acquired information, and notifies the operation control unit 51*b* of the determined operation timings and operation contents.

For example, the timing acquisition unit 51*a* acquires the timing at which the workpiece 500 is transported to a predetermined position, and instructs the operation control unit 51*b* to operate the first robot 10, the second robot 20, and the transport table 110 based on the acquired timing.

The operation control unit 51*b* operates the first robot 10, the second robot 20, and the traveling table 110 based on the instruction from the timing acquisition unit 51*a* and the teaching information 52*a*. In addition, the operation control unit 51*b* improves the operation accuracy of the first robot 10, the second robot 20, and the traveling table 110 by performing feedback control or the like using encoder values in actuators such as motors which are power sources of the first robot 10, the second robot 20, and the traveling table 110.

The teaching information 52*a* is created in a teaching stage of teaching an operation to the first robot 10, the second robot 20, and the traveling table 110 and is information including a "job" which is a program for defining an operation path of the robot or the like. As shown in FIG. 1, when each of the robots is arranged at positions symmetrical with respect to the workpiece 500, the teaching data can be shared or used reversely. Therefore, according to the robot system 1, it is possible to reduce the labor and cost of generating the teaching information 52*a* including the teaching information.

Figure 7A:
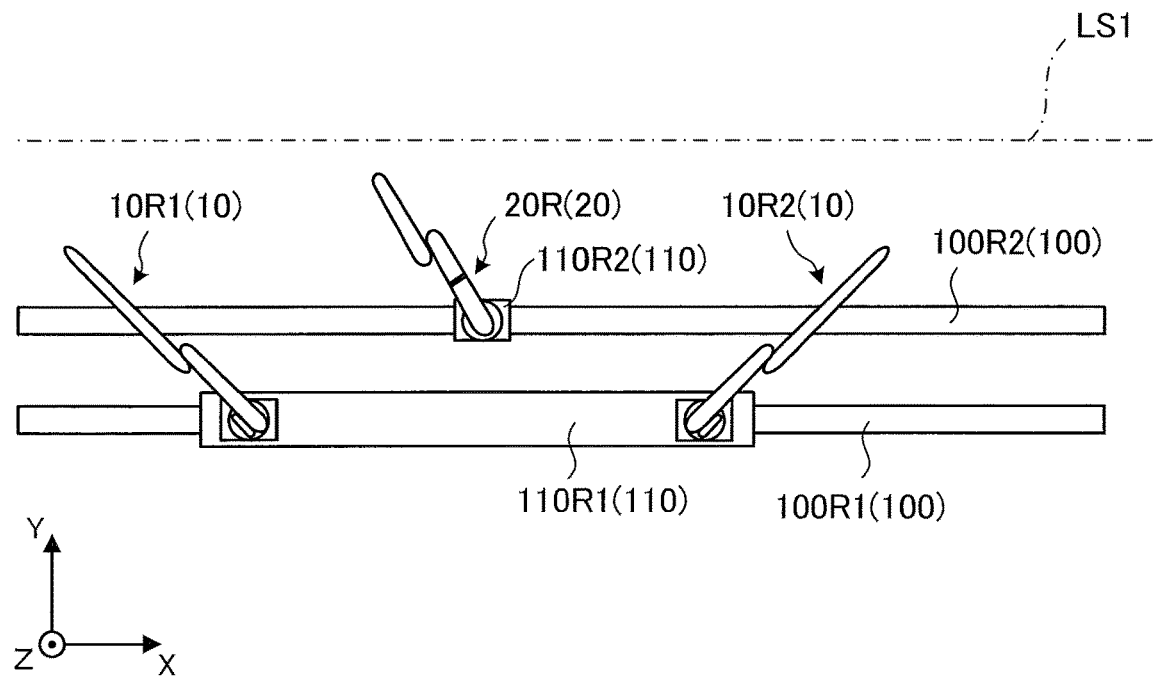
FIG. 7A is a diagram schematically illustrating a first modification of the traveling shaft.
Figure 7B:
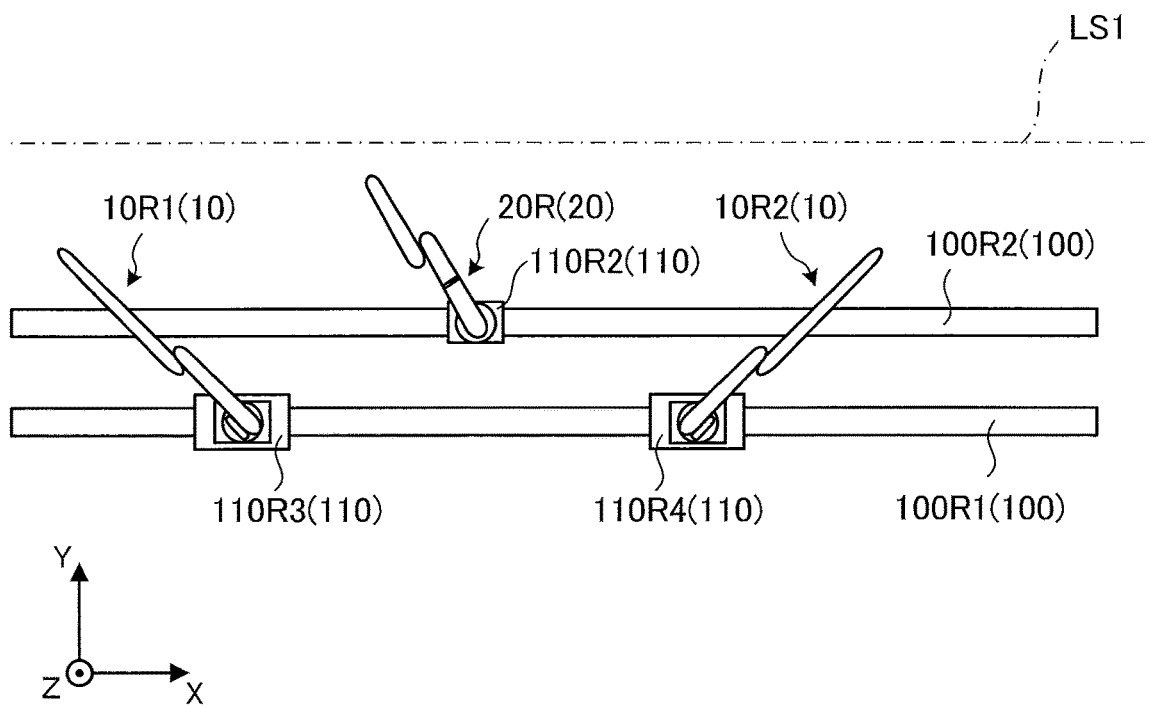
FIG. 7B is a diagram schematically illustrating a second modification of the traveling shaft.

Next, a modified example of the traveling shaft 100 shown in FIG. 1 will be described with reference to FIG. 7A and FIG. 7B. FIG. 7A is a diagram schematically showing a first modification of the traveling shaft 100, and FIG. 7B is a diagram schematically showing a second modification of the traveling shaft 100. In FIGS. 7A and 7B, only the right side (Y axis negative direction side) of the workpiece 500 is shown, and the left sides (Y axis positive direction side) of the workpiece 500 and the workpiece 500 are not shown.

FIG. 7A is a modification in which the traveling shafts 100R shown in FIG. 1 are changed to traveling shaft 100R1 for the first robot 10 and traveling shaft 100R2 for the second robot 20. As shown in FIG. 7A, a first robot 10R1 and a first robot 10R2 are provided on a traveling table 110R1 that travels on the traveling shaft 100R1. In addition, a second robot 20R is provided in traveling table 110R2 which travels on the traveling shaft 100R2.

In this manner, the traveling shaft 100 may be provided separately for the first robot 10 and the second robot 20. Note that, in FIG. 7A, the case where the traveling shaft 100R1 for the first robot 10 is farther from the transport center line LS1 than the traveling shaft 100R2 for the second robot 20 is shown, but the traveling shaft 100R1 may be provided at a position closer to the transport center line LS1 than the traveling shaft 100R2.

FIG. 7B is a modified example in which the traveling table 110R1 shown in FIG. 7A is separated for each first robot 10. As shown in FIG. 7B, a first robot 10R1 is provided on a traveling table 110R3 that travels on a traveling shaft 100R1, and a first robot 10R2 is provided on a traveling table 110R4 that travels on a traveling shaft 100R1. That is, the example of FIG. 7B is different from the example of FIG. 7A in that the first robots 10 are provided on independent traveling tables 110 one by one. It should be noted that the point that the second robot 20R is provided on the traveling table 110R2 that travels on the traveling shaft 100R is the same as the example of FIG. 7A.

Note that, in FIG. 7B, the case where the traveling shaft 100R1 for the first robot 10 is farther from the transport center line LS1 than the traveling shaft 100R2 for the second robot 20 is shown, but the traveling shaft 100R1 may be provided at a position closer to the transport center line LS1 than the traveling shaft 100R2.

In addition, in FIG. 7B, the case where the traveling shaft 100R1 for the first robot 10 and the traveling shaft 100R2 for the second robot 20 are separated from each other is shown, but any one of the traveling shafts 100 may be omitted, and three traveling tables 110 may travel on one traveling shaft 100.

As described above, the robot system 1 according to the embodiment includes the two first robots 10 and the one second robot 20. The first robot 10 is an articulated robot that is arranged along the transport direction of the workpiece 500 to work the workpiece 500. The second robot 20 is an articulated robot that is provided between the two first robots 10 along the transport direction to work the workpiece 500, and has an axis configuration different from the axis configuration of the first robot 10. The first robot 10 is an articulated robot having seven axes arranged in an axis configuration in which a rotation axis, a pivot axis, a pivot axis, and a rotation axis are arranged in this order from the distal end of the first robot.

As described above, according to the robot system 1 of the embodiment, the second robot 20 having an axis configuration different from that of the first robot 10 is disposed in the transport direction between the first robots 10 which are the articulated robots having seven axes arranged in an axis configuration in which a rotation axis, a pivot axis, a pivot axis, and a rotation axis are arranged in the order from the distal end of the first robot. Therefore, it is possible to simultaneously perform work from the front and rear direction of the workpiece 500 and work from the lateral direction of the workpiece. Therefore, it is possible to improve the efficiency of the operation by the robot.

In addition, in the embodiment described above, an example in which the first robot 10 and the second robot 20 are seven-axis robots has been described, but at least one of the first robot 10 and the second robot 20 may be an eight-axis or more robot.

Additional advantages and modifications will readily appear to those skilled in the art. Thus, the broader aspects of the present invention are not limited to the specific details and representative embodiments shown and described above. Accordingly, various modifications may be made without departing from the spirit or scope of the general inventive concept as defined by the appended claims and their equivalents.

What is claimed is:

1. A robot system comprising:
   first and third robots arranged along a transport direction in which a workpiece is conveyed, each of the first and third robots having a first distal end at which a first end effector is configured to be provided to work on the workpiece and having a plurality of axes arranged in a first axis configuration in which a rotation axis, a pivot axis, a pivot axis, and a rotation axis are arranged in this order from the first distal end;
a second robot arranged between the first and third robots along the transport direction, the second robot having a second distal end at which a second end effector is configured to be provided to work on the workpiece, the second robot having a second axis configuration different from the first axis configuration, the first and third robots and the second robot are each provided on a same traveling shaft that extends in the transport direction; and
a traveling table configured to travel on the same traveling shaft in the transport direction,
wherein the first and third robots and the second robot are each mounted on the traveling table.

2. The robot system according to claim 1,
wherein the second robot has a plurality of axes and a proximal end opposite to the second distal end along a length of the plurality of axes, and
wherein the second axis configuration has a rotation axis, a pivot axis, a rotation axis, and a pivot axis arranged in this order from the proximal end.

3. The robot system according to claim 1, wherein the first, second, and third robots work on the workpiece while the workpiece is being conveyed.

4. The robot system according to claim 1, wherein each of the first, second, and third robots comprises an arc welding end effector provided at each of the first distal end and the second distal end.

5. The robot system according to claim 1, wherein each of the first, second, and third robots comprises a sealing end effector provided at each of the first distal end and the second distal end to apply a sealing agent to seal the workpiece.

6. The robot system according to claim 1,
wherein the first robot is configured to insert the first distal end of the first robot into an opening on a front surface of the workpiece in the transport direction to work on an interior of the workpiece,
wherein the third robot is configured to insert the first distal end of the third robot into an opening on a back surface of the workpiece to work on the interior of the workpiece; and
wherein the second robot is configured to insert the second distal end of the second robot into an opening on a side surface of the workpiece with respect to the transport direction.

7. The robot system according to claim 6,
wherein the first, second, and third robots are provided on one side of the workpiece with respect to the transport direction and are configured to work on the workpiece in a first area between a transport center line and the first, second, and third robots, and
wherein additional first, second, and third robots are provided on another side opposite to the one side with respect to the transport center line and are configured to work on the workpiece in a second area between the transport center line and the additional first, second, and third robots.

8. The robot system according to claim 1, wherein each of the first and third robots has seven axes.

9. The robot system according to claim 1, wherein the second robot has seven axes.

10. The robot system according to claim 1, wherein the first and third robots have a same structure.

11. The robot system according to claim 1,
wherein the first and third robots and the second robot are each mounted at fixed locations with respect to one another on the traveling table.

12. The robot system according to claim 1,
wherein the second robot has seven axes and a proximal end opposite to the second distal end, and
wherein the second axis configuration has a rotation axis, a pivot axis, a rotation axis, a pivot axis, a rotation axis, a pivot axis, and a rotation axis arranged in this order from the proximal end.

13. A robot system comprising:
first and third robots arranged along a transport direction in which a workpiece is conveyed, each of the first and third robots having a first distal end at which a first end effector is configured to be provided to work on the workpiece and having a plurality of axes arranged in a first axis configuration in which a rotation axis, a pivot axis, a pivot axis, a rotation axis, a pivot axis, a pivot axis, and a rotation axis are arranged in this order from the first distal end; and
a second robot arranged between the first and third robots along the transport direction, the second robot having a second distal end at which a second end effector is configured to be provided to work on the workpiece, the second robot having a second axis configuration different from the first axis configuration,
wherein the first and third robots and the second robot are each mounted at a same vertical height; and
a traveling table configured to travel on a same traveling shaft in the transport direction,
wherein the first and third robots and the second robot are each mounted on the traveling table.

14. The robot system according to claim 13,
wherein the first and third robots are each provided on the same traveling shaft that extends in the transport direction.

15. The robot system according to claim 13, wherein the first and third robots have a same structure.

16. The robot system according to claim 13,
wherein the second robot has seven axes and a proximal end opposite to the second distal end, and
wherein the second axis configuration has a rotation axis, a pivot axis, a rotation axis, a pivot axis, a rotation axis, a pivot axis, and a rotation axis arranged in this order from the proximal end.

17. A robot system comprising:
first and third robots arranged along a transport direction in which a workpiece is conveyed, each of the first and third robots having a first distal end at which a first end effector is configured to be provided to work on the workpiece and having a plurality of axes arranged in a first axis configuration in which a rotation axis, a pivot axis, a pivot axis, a rotation axis, a pivot axis, a pivot axis, and a rotation axis are arranged in this order from the first distal end; and
a second robot arranged between the first and third robots along the transport direction, the second robot having a second distal end at which a second end effector is configured to be provided to work on the workpiece, the second robot having a second axis configuration different from the first axis configuration; and
a traveling table configured to travel on a same traveling shaft in the transport direction, wherein the first and third robots and the second robot are each mounted on the traveling table.

18. The robot system according to claim 17, wherein the first and third robots have a same structure.

19. The robot system according to claim 17,
wherein the second robot has seven axes and a proximal end opposite to the second distal end, and
wherein the second axis configuration has a rotation axis, a pivot axis, a rotation axis, a pivot axis, a rotation axis, a pivot axis, and a rotation axis arranged in this order from the proximal end.

20. The robot system according to claim 17,
wherein the first axis configuration has, arranged in this order from the first distal end, a sixth axis being the rotation axis, a fifth axis being the pivot axis, a fourth axis being the pivot axis, a third axis being the rotation axis;
wherein each of the first and third robots have a wrist portion having a rotating part configured to rotate about the sixth axis, the wrist portion having a turning part configured to pivot about the fifth axis, a fourth arm configured to pivot about the fourth axis, and a third arm configured to rotate about the third axis in relation to a second arm; and
wherein the second arm, the third arm, the fourth arm, and the wrist portion each have a through hole that can each be aligned with each other when the third axis and the sixth axis are aligned to overlap.

\* \* \* \* \*